M. Wilder,
Mill Shaft Spindle,
N° 7,278.            Patented Apr. 9, 1850.

UNITED STATES PATENT OFFICE.

MARK WILDER, OF PRINCETON, MASSACHUSETTS.

WING-GUDGEON.

Specification of Letters Patent No. 7,278, dated April 9, 1850.

*To all whom it may concern:*

Be it known that I, MARK WILDER, of Princeton, in the county of Worcester and State of Massachusetts, have invented a new and useful Improvement in the Wing-Gudgeon for Mill or Wooden Shafts; and I do hereby declare that the same is fully described and represented in the following specification and accompanying drawings, letters, figures, and references thereof.

Figure 1:
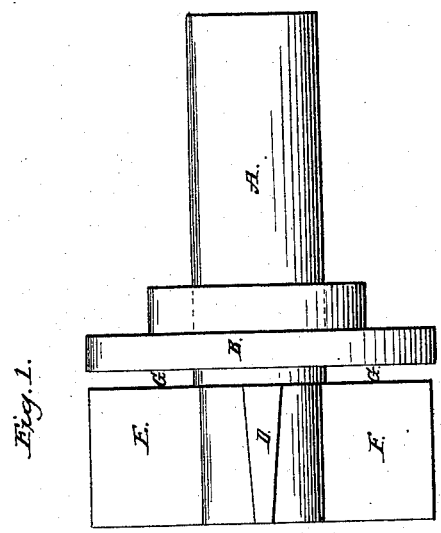
Figure 2:
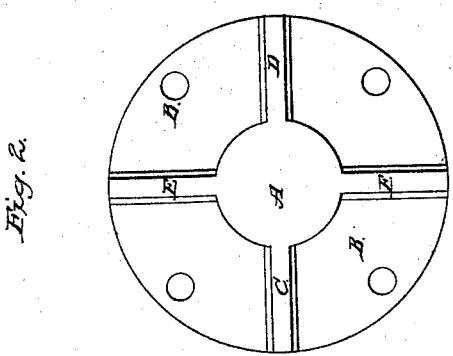

Of the said drawings Figure 1 denotes a side view of one of my improved gudgeons. Fig. 2 is an end view of it, and the wings of it.

My improvement although simple is of great practical advantage, inasmuch as it enables me to so finish or construct the wing gudgeon, as to render it when applied to a shaft very difficult to get displaced or out of center, as so frequently occurs, with those winged gudgeons as otherwise constructed.

In the said figures, A is the journal or gudgeon; B, a circular or flanch plate thereof.

C, D, E, and F, are the wings of the gudgeon radiating and extending therefrom and placed at a distance from the plate B as seen in Fig. 1 of the drawings, that is to say there is a clear space G between each wing and the said flanch plate; the same being to allow of the rear face of the flanch plate being turned down (in a lathe) in a plane at right angles to the axis of the gudgeon, in order that when the end of the wooden shaft to which the gudgeon is to be affixed is turned down at right angles to the axis of the shaft, and the flanch plate is applied to it the axis of the gudgeon may coincide with or be in a direct line with that of the wooden shaft.

What I claim, is—

The improvement of making the wing gudgeon, (when cast or founded), with a clear space G between each of the wings and the flanch or face plate B, the same being for the purpose hereinabove set forth.

In testimony whereof I have hereto set my signature this sixth day of June A. D. 1849.

MARK WILDER.

Witnesses:
    A. BROOKS,
    SALEM WILDER,
    WM. GAST.